United States Patent [19]
Geysen et al.

[11] Patent Number: 6,151,973
[45] Date of Patent: Nov. 28, 2000

[54] BEAD PICKING APPARATUS AND METHOD

[75] Inventors: H. Mario Geysen, Chapel Hill; James C. Nelson, Cary; Charles Buckner, Durham, all of N.C.

[73] Assignee: Glaxo Wellcome Inc., Research Triangle Park, N.C.

[21] Appl. No.: 09/240,758

[22] Filed: Jan. 29, 1999

[51] Int. Cl.[7] .................................................. G01N 1/00
[52] U.S. Cl. ............................................................. 73/865.8
[58] Field of Search ........................... 73/865.5, 865.8, 73/863, 53.01, 864.01, 61.41, 61.71; 356/372, 375; 324/691, 693, 724

[56] References Cited

U.S. PATENT DOCUMENTS

| | | | |
|---|---|---|---|
| 2,540,059 | 1/1951 | Stirn et al. | 226/103 |
| 2,755,008 | 7/1956 | Beltz et al. | 226/96 |
| 3,598,251 | 8/1971 | Sieurin | 214/1 Q |
| 3,874,431 | 4/1975 | Aronson | 141/129 |
| 3,940,172 | 2/1976 | Hutson et al. | 294/64 R |
| 4,244,863 | 1/1981 | Hemmerich et al. | 260/42.55 |
| 4,266,905 | 5/1981 | Birk et al. | 414/627 |
| 4,328,189 | 5/1982 | Haese et al. | 422/224 |
| 4,412,673 | 11/1983 | Ramsden et al. | 254/134.3 |
| 4,492,294 | 1/1985 | Ball | 193/25 C |
| 4,586,546 | 5/1986 | Mezei et al. | 141/2 |
| 4,640,322 | 2/1987 | Ballester | 141/5 |
| 4,768,919 | 9/1988 | Borgman et al. | 414/752 |
| 4,770,454 | 9/1988 | Muscher et al. | 294/64.1 |
| 4,858,975 | 8/1989 | Ogawa | 294/64.1 |
| 4,887,351 | 12/1989 | Porterfield et al. | 29/740 |
| 4,981,315 | 1/1991 | Poli et al. | 294/64.1 |
| 4,989,463 | 2/1991 | Cimaglia et al. | 73/863.86 |
| 5,046,539 | 9/1991 | MacLeish et al. | 141/234 |
| 5,207,467 | 5/1993 | Smith | 294/64.1 |
| 5,280,979 | 1/1994 | Poli et al. | 294/64.1 |
| 5,366,122 | 11/1994 | Guentert et al. | 222/401 |
| 5,414,955 | 5/1995 | Morin | 47/1.01 |
| 5,474,744 | 12/1995 | Lerch | 422/100 |
| 5,480,617 | 1/1996 | Uhlemann et al. | 422/140 |
| 5,488,567 | 1/1996 | Allen et al. | 364/497 |
| 5,500,348 | 3/1996 | Nishimura et al. | 435/7.24 |
| 5,503,805 | 4/1996 | Sugarman et al. | 422/131 |
| 5,722,470 | 3/1998 | Kedar et al. | 141/100 |

FOREIGN PATENT DOCUMENTS

| | | |
|---|---|---|
| 949786 | 6/1974 | Canada . |
| 1309 424 | 3/1973 | United Kingdom . |
| 1 420 364 | 1/1976 | United Kingdom . |

OTHER PUBLICATIONS

Lawrence Normie, "System Uses Photonics for Early Tumor Detection," *Biophotonics News, Biophotonics International*, Sep./Oct. 1996, pp. 24–25.

H. Mario Geysen et al., "Isotope or Mass Encoding of Combinatorial Libraries," *Chemistry & Biology*, Aug. 1996, 3:679–688.

D.S. Wagner et al., "Ratio Encoding Combinatorial Libraries with Stable Isotopes and their Utility in Pharmaceutical Research," *Combinatorial Chemistry & High Throughout Screening*, 1998, 1, pp. 143–153.

*Primary Examiner*—Robert Raevis
*Attorney, Agent, or Firm*—Townsend and Townsend and Crew LLP

[57] ABSTRACT

The invention provides exemplary systems and methods for processing solid supports. According to one system, a probe is provided having a distal end and a lumen terminating at the distal end. The transport mechanism is adapted to place the distal end of the probe into a well having a plurality of solid supports that are held within a fluid. A detection mechanism is provided to detect the presence or absence of one of the solid supports at the distal end while the distal end is within the fluid. A measuring system is provided to measure the general size of the attached solid support.

22 Claims, 12 Drawing Sheets

Fig. 3A
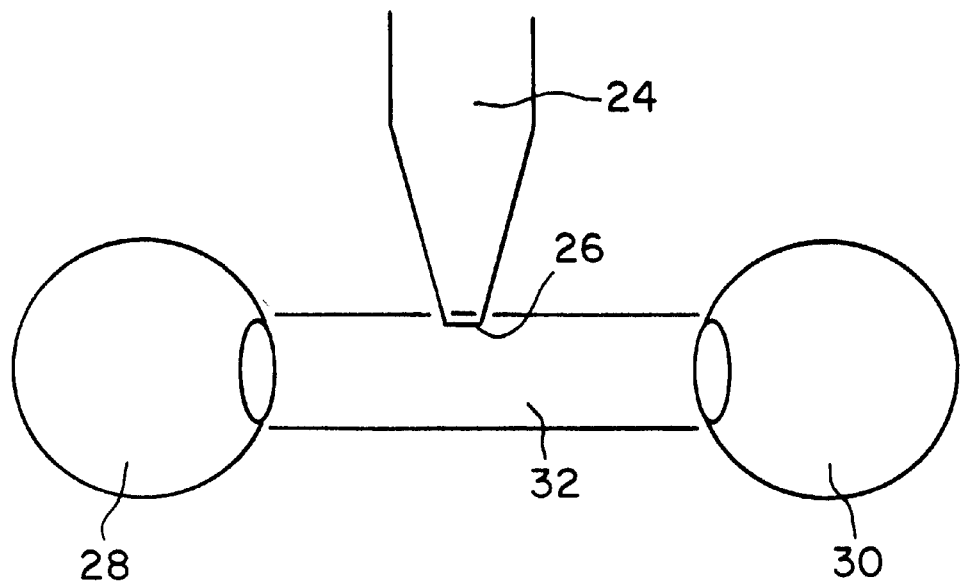
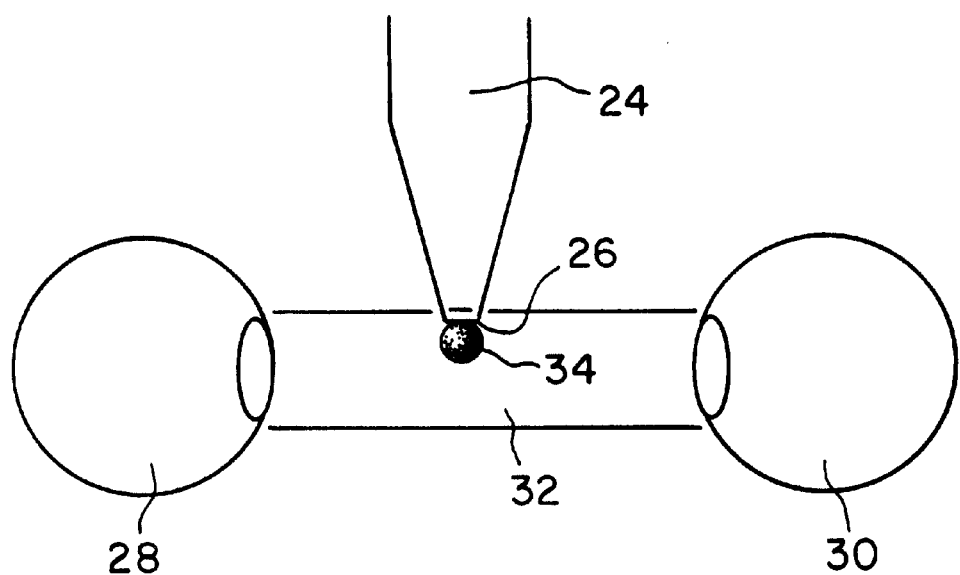
Fig. 3B

BEAD PICKING APPARATUS AND METHOD

BACKGROUND OF THE INVENTION

This invention relates generally to the field of combinatorial chemistry, and in particular, to chemical libraries which are synthesized into solid supports, such as beads. More specifically, the invention relates to the processing of such solid supports on an individual basis.

The use of combinatorial chemical libraries has become an important part of the drug discovery process. A variety of techniques have been proposed for producing such libraries. Of particular interest to the present invention is the split and recombine technique which is employed to produce large libraries of compounds which are synthesized on solid supports. This technique is described generally in co-pending U.S. patent application Ser. No. 09/091,954, filed Jun. 26, 1998 (internal docket no. PU3077), the complete disclosure of which is herein incorporated by reference. During synthesis, various encoding schemes may be utilized as described generally in H. Mario Geysen, "Isotope or Mass Encoding of Combinatorial Libraries," Chemistry & Biology, August 1996, 3:679–688 and D. S. Wagner et al., "Ratio Encoding Combinatorial Libraries with Stable Isotopes and Their Utility in Pharmaceutical Research," Combinatorial Chemistry & High Throughput Screening, 1998, 1, 143–153. The complete disclosures of these references are herein incorporated by reference.

One advantage of synthesizing the chemicals onto solid supports is that the solid supports serve as transport mechanisms to facilitate movement of the synthesized chemicals. The solid supports typically comprise spherical beads having a size on the order of about 90 $\mu$m to about 250 $\mu$m. One exemplary type of bead is a resin bead comprising a lightly cross-linked polystyrene or a polyethylene oxide grafted resin. To prevent the beads from sticking together, the beads are typically stored in wells containing a fluid. As described below, many circumstances exist where the beads need to be separated from each other and transferred to other locations.

For example, during the synthesis process, it is often desirable to evaluate the quality of the library being produced. To do so, a sampling of the beads from the library is removed and analyzed. Preferably, individual beads are removed from a pool of beads so that cleavage can be performed and the cleaved compounds be analyzed using mass spectrometry.

Following synthesis, the compounds on the beads are also analyzed. This may be accomplished, for example, by cleaving mixtures of compounds from a pool of beads. Each mixture is then screened. If hits are found in the mixture, the pool of beds must be arrayed as single beads and decoded.

When arraying the pool as single beads, each bead is individually removed from the well and transferred to a destination well. In order to optimize the results, there is a need to ensure that each destination well receives only a single bead and that all of the beads are removed from the pool of beads. Otherwise, more resources may be needed during the decoding process. Also, if there is uncertainty as to whether a bead was placed in a destination well, uncertainty may exist about whether valuable information was lost during the transfer.

When transferring beads between wells, there may also be a need to know the size of the bead being transferred. For example, sometimes the bead may be only a partial bead. In other cases, one or more beads may be stuck to the bead being transferred. Such occurrences can detrimentally affect the decoding process.

Previously proposed techniques for transporting solid supports include the use of a microscope and a pair of tweezers or glass capillaries which are sucked on by a person to attract a solid support. As such, these prior art manual processes are cumbersome, labor intensive, slow and prone to sampling error. Indeed, such manual methods are so inefficient and prone to sampling errors that they are practically useless with today's large combinatorial libraries.

Hence, it would be desirable to provide systems and methods which would overcome or greatly reduce the problems associated with prior art techniques for processing solid supports. In particular, it would be desirable to provide systems and methods for efficiently processing solid supports following a synthesis process, particular on an individual basis. The systems and methods should generally insure that a single bead is actually transferred each time it is intended to transfer only a single bead. The systems and methods should also check for partial beads or multiple beads. Finally, the systems and methods should be efficient to minimize the time required to process large quantities of beads.

SUMMARY OF THE INVENTION

The invention provides exemplary systems and methods for processing solid supports. In one exemplary embodiment, a system comprises a probe having a distal end and a lumen that terminates at the distal end. A transport mechanism is provided to place the distal end of the probe into a well having a plurality of solid supports which are held within a fluid. A detection mechanism is also provided to detect the presence or absence of one of the solid supports at the distal end while the distal end is within the fluid. Further, the system includes a measuring system which is employed to measure the general size of the attached solid support.

Such a system is particularly advantageous in that the detection mechanism provides an effective way to remove all of the solid supports from the well, i.e., to pick to exhaustion with essentially 100% fidelity. Importantly, the detection mechanism is disposed to detect the presence or absence of the solid support while the distal end is within the fluid. In this way, the probe does not need to be removed from the well in order to evaluate whether a solid support is being transferred. As such, the time required to pick to exhaustion is greatly reduced, thereby significantly increasing throughput.

The measuring system is advantageous in that it provides a second check to determine if the solid support is still attached to the distal end of the probe. Moreover, the measuring system is able to measure the size of the solid support to determine if the solid support is only a partial bead, or if one or more beads are attached to the bead being transferred. In this manner, a way is provided to ensure that only a single bead (rather than a partial bead or multiple beads) is transferred into a well.

In one particular aspect, the detection mechanism comprises a pair of electrodes that are disposed to pass electrical current through the distal end of the probe. The detection mechanism also includes circuitry to measure a change in the current that passes between the electrodes. In this manner, the detection mechanism is able to detect a lower current level when a bead is attached to the distal end. In another aspect, the measuring system preferably comprises a pair of spaced apart optical fibers. One of the optical fibers produces a beam of light which is collected by the other optical fiber. The beam is at least partially blocked by the solid support after the distal end of the probe is removed from the well by the transport mechanism. The measuring system is able to detect the blockage of the light, and is able to quantify this value in order to determine the general size of the solid support.

In yet another particular aspect, the system preferably also includes a pump which is employed to withdraw a volume of fluid from the well and into the lumen in order to attract a bead to the distal end of the probe. Preferably, the pump comprises a syringe pump that maintains a suction force to hold the solid support to the end of the probe. The pump is preferably also configured to dispense fluid from the lumen in order to expel the attached solid support.

In another particular aspect, the transport mechanism is preferably configured to move the probe along a vertical z-axis. Conveniently, the transport mechanism may also be configured to move the probe along a horizontal x-axis. A stage is preferably also provided to hold the well and to move the well along a horizontal y-axis. In this manner, the transport mechanism provides three degrees of movement to allow the probe to be moved to a variety of locations so that it may be inserted into one of a plurality of wells which are disposed on the stage. Conveniently, one or more holding mechanisms may be provided to hold the wells. The holding mechanisms are attachable to the stage to facilitate positioning of the wells relative to the probe.

In another aspect, the system preferably also includes a one or more processors which are configured to control operation of the transport mechanism, the detection mechanism and the measuring system. The processor may also be configured to control operation of the pump. In this way, processing of the solid supports may proceed in a fully automated manner.

The invention further provides a exemplary method for processing solid supports. According to the method, a plurality of solid supports are provided and disposed within a well containing a fluid. A probe is inserted into the well, with the probe having a distal end and a lumen terminating at the distal end. While the distal end of the probe is within the fluid, a volume of fluid is aspirated from the well and into the lumen. The presence or absence of one of the solid supports at the distal end is then detected while the distal end is within the fluid. If the absence of the solid support is detected, the aspirating step is repeated until the presence of the one of the solid supports is detected, or until the aspirating step has been repeated a predetermined number of times without success. Once the presence of a solid support at the distal end has been detected, the probe is removed from the well so that the solid support may be transferred to another location.

Such a method is advantageous in that the presence or absence of one of the solid supports at the distal end of the probe may be detected while the probe remains in the fluid. If a solid support is not detected, the aspirating step can simply be repeated until a solid support is detected. In this way, the time required to pick the solid supports to exhaustion is greatly reduced. Further, a way is provided to ensure that a solid support is actually being removed from the well as the probe is removed.

In one particularly preferable aspect, the size of the solid support is measured while the solid support is attached to the distal end of the probe. Measurement of the solid support is preferably accomplished by placing the solid support in the path of a light beam and measuring a change in the passage of light caused by the solid support. In this manner, a secondary check is provided to ensure that the solid support remains attached to the probe after the probe has been removed from the well (or removed from another well, such as a wash station). Further, by detecting the change in the passage of light, the relative size of the bead may be determined to evaluate whether the bead is only a partial bead or whether one or more beads are attached to the bead being transferred.

Preferably, the detecting step is accomplished by utilizing an electrically conductive medium as the fluid. With this configuration, electrical current is preferably passed through the distal end of the probe, and the current is measured over time to detect a change in the amount of current. If a change in current is detected, such a change indicates that a solid support has been attracted to the distal end of the probe, thereby reducing the amount of current passing through the probe.

In another particular aspect, a volume of fluid is preferably dispensed from the lumen and into the well before repeating the aspirating step. Preferably, the volume of fluid dispensed and the volume of fluid aspirated are substantially equal. In this way, the probe will remain primed so that electrical current may be passed through the fluid and out the distal end to allow for the detection of the solid support at the distal end as previously described.

In another particular aspect, the solid supports comprise generally spherical beads having a size in the range from about 1 $\mu$m to about 1000 $\mu$m, and more preferably from about 90 $\mu$m to about 250 $\mu$m. In another aspect, the distal end of the probe having the solid support is placed into another well having a washing solution. The distal end is then removed from the washing solution and the distal end of the probe is sensed to determine whether the solid support remains attached to the distal end. In this way, a check is provided to ensure that the solid support does not detach during the washing step. In an alternative step, the distal end of the probe having a solid support is placed into a destination well and fluid is dispensed from the lumen to expel the solid support into destination well. Following this step, the distal end is removed from the destination well and the distal end is sensed to determine whether the solid support has successfully been expelled into the destination well.

BRIEF DESCRIPTION OF THE DRAWINGS

FIGS. 3A and 3B illustrate an exemplary optical sensor utilized to measure the size of a solid support according to the invention.

DESCRIPTION OF THE PREFERRED EMBODIMENT

Figure 1A:
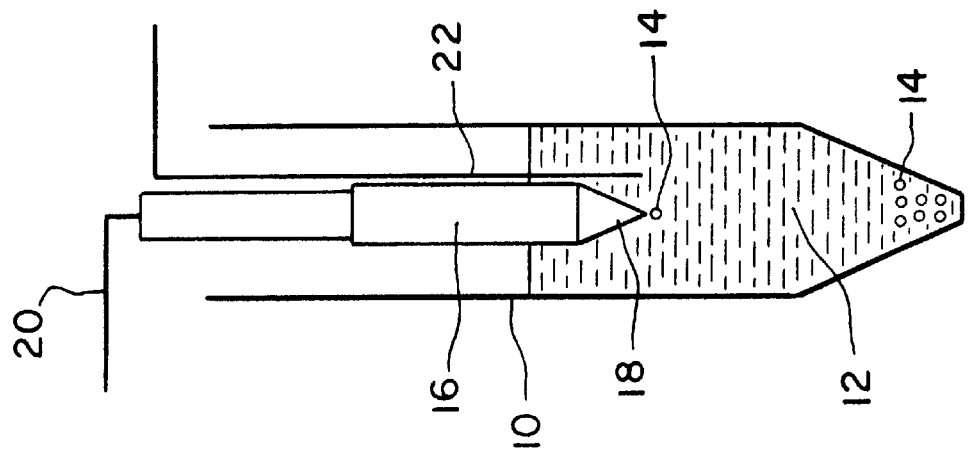
FIGS. 1A–1C are schematic views of an exemplary probe being inserted into a well to individually extract solid supports held within the well according to the invention.

The invention provides exemplary systems and methods for processing solid supports. Preferably, the solid supports have chemical compounds which are synthesized thereon as previously described in the Background Section. The solid supports preferably comprise beads onto which the chemical compounds have been synthesized as is known in the art. The systems and methods of the invention may be used with essentially any type of commercially available beads including, but not limited to, spherical resin beads comprising lightly cross-linked polystyrene (Merrifield resin) or polyethylene oxide grafted Merrifield resin (Tenta Gel resin), commercially available from suppliers such as Nova Biochem and Rapp Polymere GmbH. Typically, the spherical resin beads have a diameter in the range from about 1 $\mu$m to about 1000 $\mu$m, and more preferably from about 90 $\mu$m to about 250 $\mu$m.

The invention will find its greatest use in processing solid supports onto which combinatorial chemical libraries have been synthesized using a split and recombined method. However, it will be appreciated that the systems and methods may be utilized with essentially any type of solid support that needs to be moved from one location to another location. When utilized in connection with the chemical libraries which have been constructed using a split and recombined technique, the systems and methods of the invention may be employed to process the solid supports both before assays have been performed on the solid supports and after assays have been performed as described in greater detail hereinafter.

One important feature of the systems and methods of the invention that they are able to detect the presence or absence of a solid support at the distal end of a probe while the probe is within the well that holds a pool of solid supports. In this manner, a way is provided to ensure that a solid support is actually being removed from the well as the probe is removed from the well. As such, the systems and methods of the invention facilitate picking with 100% efficacy, i.e. picking to exhaustion. Importantly, the detection of the bead is accomplished while the probe is within the fluid. This technique is extremely efficient so that throughput can be greatly enhanced. Such throughput is necessary with today's modern combinatorial libraries which can be extremely large, i.e., on the order of tens of thousands of beads.

By ensuring that a bead is removed from the well each time the probe is removed, and by ensuring that the beads are picked to exhaustion, it can generally be ensured that each destination well has only a single bead. In this way, the accuracy of the decoding process is greatly improved. Further, fewer resources are needed to decode the compounds.

The systems and methods of the invention also measure the general size of the solid support that is attached to the probe. This measurement step may serve as a secondary check to determine that the solid support has actually been removed from the well. Further, measurement of the size of the bead allows for the determination of whether only a partial bead has been removed, or if more than one bead has stuck to the bead being transferred. In this manner, a way is provided to ensure that each destination well receives only a single bead, and a bead which is not flawed.

Figure 1B:
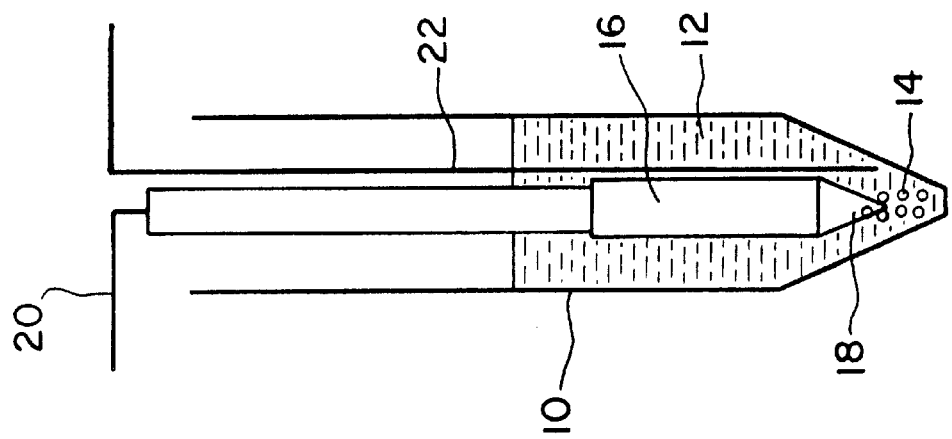
Figure 1C:
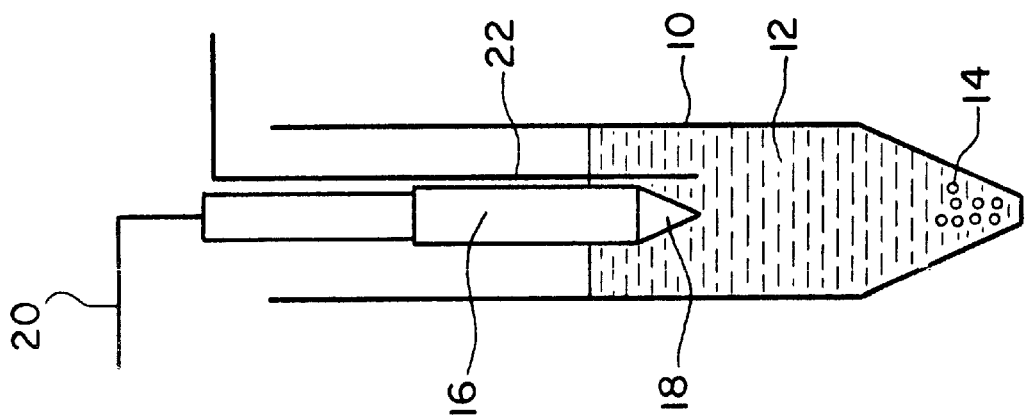

Referring now to FIGS. 1A–1C, one exemplary arrangement for detecting the presence or absence of a bead while the bead is within a well will be described schematically. Shown in FIGS. 1A–1C is a well 10 which is filled with an electrically conductive medium 12. Disbursed within medium 12 are a plurality of beads 14. Positioned within well 10 is a probe 16 having a distal end 18. Although not shown, a lumen extends the length of probe 16 and terminates at distal end 18. The size of the internal lumen is smaller than the outer diameter of beads 14 so that the beads can be held against distal end 18 when a vacuum force is employed to attract the beads to distal end 18. Probe 16 further includes a pair of electrodes 20 and 22 which are configured such that when the lumen within probe 16 is filled with the electrically conductive medium (and when probe 16 is inserted into medium 12 as shown in FIG. 1A) an electrically conductive path is provided between electrodes 20 and 22. More specifically, the current passes through the lumen and out distal end 18 where it passes through medium 12 and to electrode 22.

With such a configuration, the presence or absence of one of beads 14 at distal end 18 may be detected by measuring a change in current in the electrical circuit formed by electrodes 20 and 22 and medium 12. More specifically, if the current within the electrical circuit is reduced, this is an indicator that a bead is attached to distal end 18 which blocks the flow of current between electrodes 20 and 22.

The detection scheme of FIGS. 1A–1C may be employed with essentially any type of electrically conductive medium, including both sequencer and non-sequencer solutions. Particularly preferably types of electrically conductive media include $NH_4OAc$, NaCl, and the like. Exemplary conductive media and the criteria for conduction are described generally in Philip H. Rieger, "Electrochemistry", Prentice-Hall, Inc. 1987, the complete disclosure of which is herein incorporated by reference. Electrically conductive medium 12 is preferably selected to produce minimal bead cohesion and adhesion to the sides of the well.

To attract beads 14 to distal end 18, probe 20 is moved in the vicinity of beads 14 as shown in FIG. 1B. A pump (not shown) is then employed to aspirate medium 14 from well 10 and into the lumen of probe 16. In so doing, one of beads 14 is sucked onto distal end 18. The suction pressure is maintained so that as probe 16 is removed from well 10 (as shown in FIG. 1C), bead 14 remains attached. As previously described, electrodes 20 and 22 are employed to detect whether the bead has been attached before probe 16 is withdrawn.

In the event that a volume of the medium is aspirated and electrodes 20 and 22 are unable to detect the attachment of a bead to distal end 18, a volume of medium which is essentially equal to the volume of medium aspirated is expelled back into well 10. In this way, the lumen within probe 16 may remain primed with the electrically conductive medium. Further, as the volume of the medium is dispensed, turbulence is created in the bottom of well 10 to agitate beads 14. Another volume of electrically conductive medium 12 is then aspirated and electrodes 20 and 22 are employed to detect whether a bead was successfully attracted to distal end 18. This process may be repeated as many times as necessary until a bead is successfully attracted. Preferably, a threshold value of attempts is predefined so that the process will not endlessly be repeated. The threshold value is preferably selected to be large enough to provide a reasonable degree of assurance that no beads remain within well 10 if the threshold value has been reached. In this way, the user may be assured that the beads have been picked to exhaustion. Merely by way of example, a threshold value of around 50 may be set. If this threshold value is reached, it is assumed that no beads remain within the well.

The detection of the presence or absence of a bead at distal end 18 while probe 16 remains within medium 12 is particularly advantageous in that it reduces the time needed to determine the presence or absence of a bead. In this way, the dispensing and aspiration steps may be rapidly repeated to attempt to attract a bead 14. As will be appreciated, as the number of bead within well 16 become smaller in number, the chances for successfully attracting one of the beads is reduced. Hence, more time will be required in order to successfully attract a bead as the number of beads in the well are reduced. By maintaining distal end 18 within well 10 while detecting for the presence or absence of a bead, the throughput is greatly increased.

Figure 2:
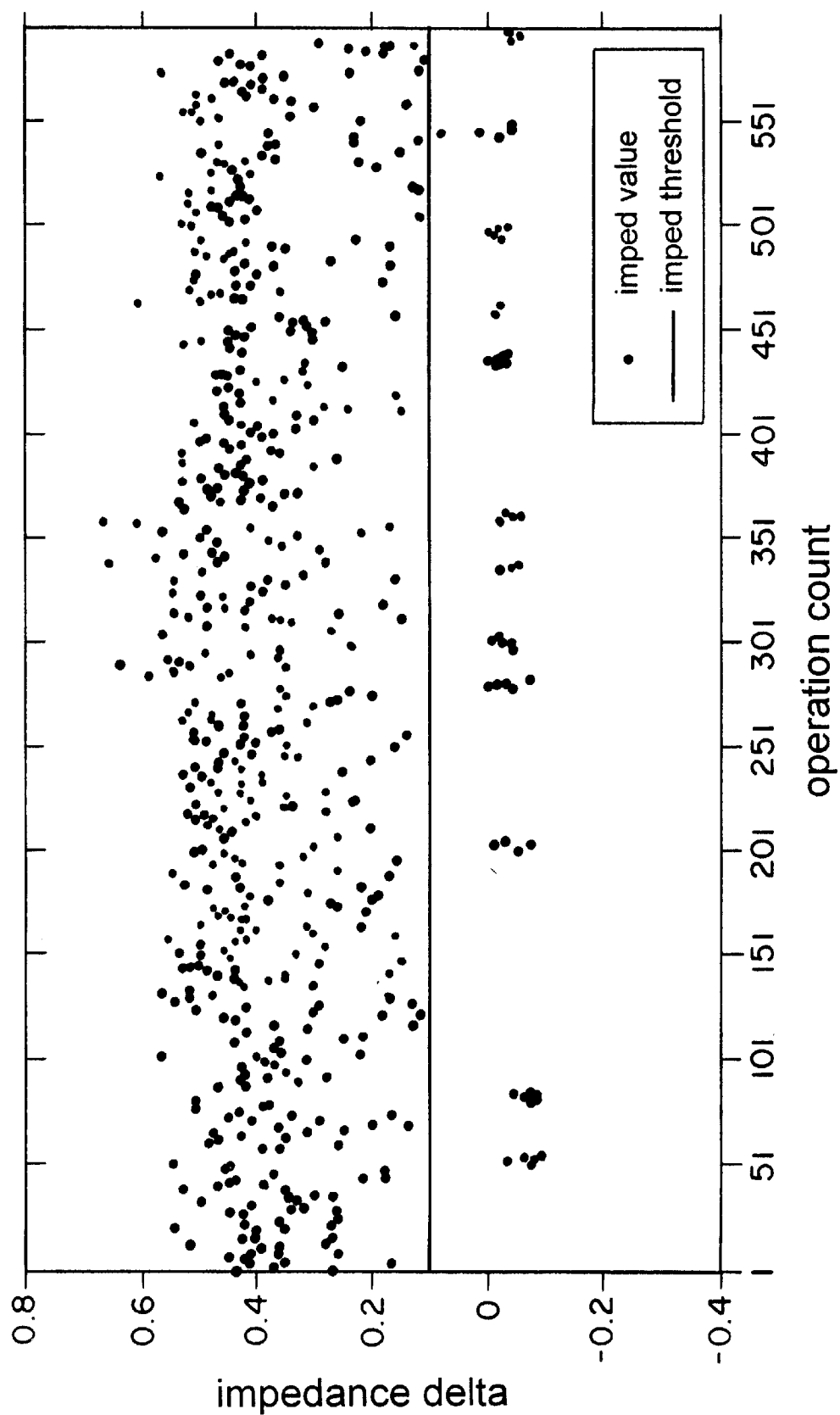
FIG. 2 is a graph showing the change of impedance detected when attempting to extract solid supports from a well utilizing a probe having a conductivity detection mechanism according to the invention.

Referring now to FIG. 2, detection of a bead at distal end 18 using a conductivity measurement will be described in greater detail. To determine the presence or absence of a bead, conductivity measurements are taken through the lumen at distal end 18 both before and after aspiration, and the difference is calculated. FIG. 2 is a graph of difference values obtained from a single process where multiple beads were included within a single well. Values smaller than the threshold value are considered to be a failure, i.e., no bead was successfully attracted. Values larger than the threshold were considered to be a success, i.e., a bead was successfully attracted. As previously described, if no bead is detected, then probe 16 remains in position and the volume of the medium that was aspirated is dispensed. Preferably, the volume of medium aspirated is in the range from about 2 micro liters to about 5 micro liters. This aspiration volume is preferable because it is sufficient to maintain an adequate attractive force between distal end 18 and the bead surface. Preferably, the process of dispensing and aspirating is repeated about 20 to 30 cycles per minute until bead is detected or the default maximum is reached.

Although bead detection at distal end 18 has been described in connection with a conductivity measurement, it will be appreciated that other types of detection schemes may be employed that do not require the use of an electrically conductive medium. Conveniently, such alternative detection schemes may detect the presence or absence of a bead by taking measurements through distal end 18 in a manner similar to the conductivity measurements. As one example, a laser having a LED may be disposed within probe 16 and pulsed to send a signal through distal end 18. Return signals are then measured and evaluated to determine whether a bead is blocking the opening at distal end 18. As another alternative, a fiber optic may be disposed within probe 16 and employed to capture light passing through the opening at distal end 18. A laser is then disposed at the bottom end of well 10 and is employed to send a light beam through the well and into the lumen of probe 16. If a bead is successfully attracted to distal end 18, the passage of light is blocked, indicating that the bead has been successfully attracted.

As shown in FIGS. 3A and 3B, the invention also provides for the measurement of the size of the bead, preferably after the bead has been removed from the well. Schematically shown in FIGS. 3A and 3B is a probe 24 having a distal end 26. As shown in FIGS. 3A and 3B, probe 24 is at a predetermined reference position. Probe 24 is configured to pass between two fiber optics 28 and 30 as probe 24 is moved up and down. A beam of light 32 is passed between the two fiber optics 28 and 30 one of which collects the transmitted light for evaluation by a measuring system (not shown). When probe 24 is at the reference position and no bead is attached to distal end 26 (as shown in FIG. 3A), then no change in transmitted light is detected. As such, it can be assumed that no bead is attached to distal end 26. However, if a bead 34 is attached to distal end 26 and probe 24 is in the reference position as shown in FIG. 3B, then a change in light will be detected by the measuring system using fiber optics 28 and 30.

Figure 4:
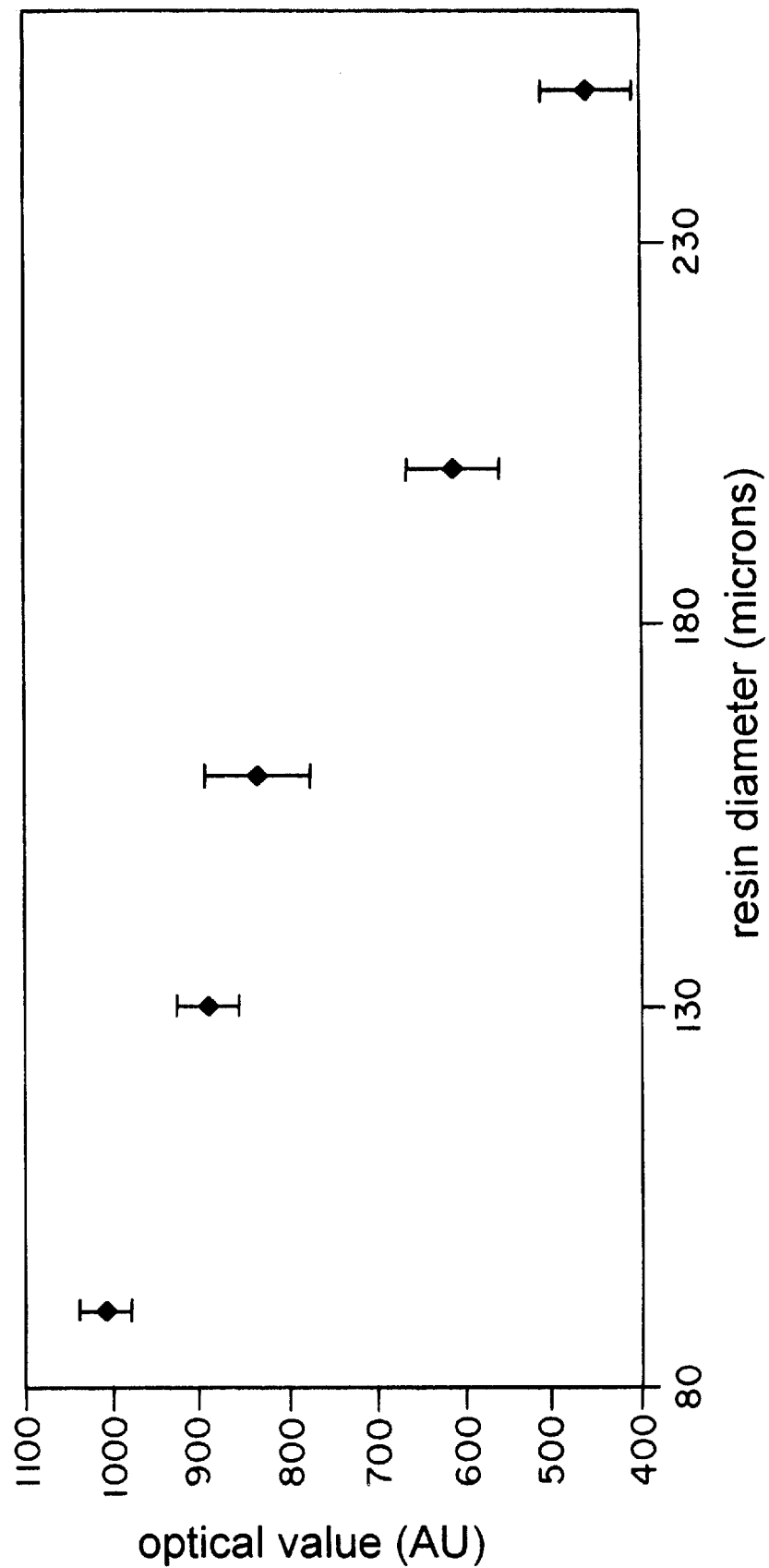
FIG. 4 is a graph showing the relation between the size of a solid support and its associated optical value.

As shown in FIG. 4, the signal obtained from fiber optics 28 and 30 is inversely proportional to the diameter of bead 34. Hence, by calibrating bead 32 for an empty distal end 26, the general size of a bead at distal end 26 may be determined. Further, fiber optics 28 and 30 in combination with the measuring system may also be employed to confirm the presence or absence of a bead.

Figure 5:
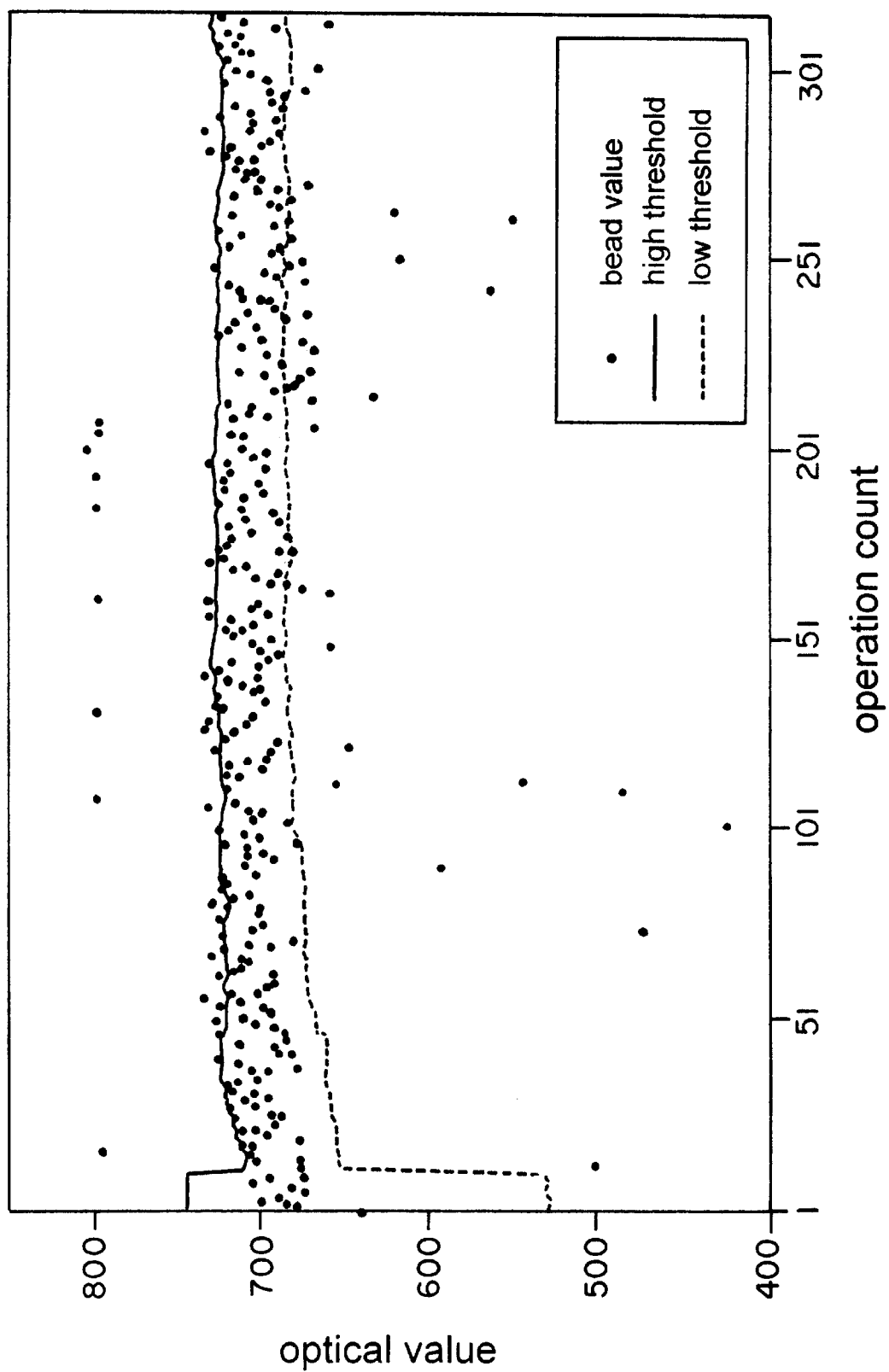
FIG. 5 is a graph showing the optical values for optical measurements taken at the distal end of a probe according to the invention.

As shown in FIG. 5, sensors 28 and 30 in combination with the measuring system may also be employed to determine whether a partial bead has been attracted, or if more than one bead has been attracted to distal end 26. In FIG. 5, the running average and deviation of bead diameter during a process is compared to the current bead diameter to allow for a determination as to whether the current bead is only a partial bead or multiple beads. In FIG. 5, optical values obtained from a single process are shown as well as the running average and range. Values lower than the low threshold are considered to be double beads. Values larger than the high threshold are considered to be partial beads.

One particular advantage of using the optical sensors is that they may be configured to move horizontally with probe 24. In this way, regardless of the horizontal position of probe 24, each time probe 24 moves through beam 32 a check can be made to evaluate whether a bead remains attached to distal end 26. For example, if a bead is moved to a wash station, an evaluation can be made after the probe is removed from the wash station to ensure that the bead was not removed during washing. As another example, when it is desired to dispense the bead into another well, an evaluation may be made to determine if the bead was successfully dispensed.

Figure 6:
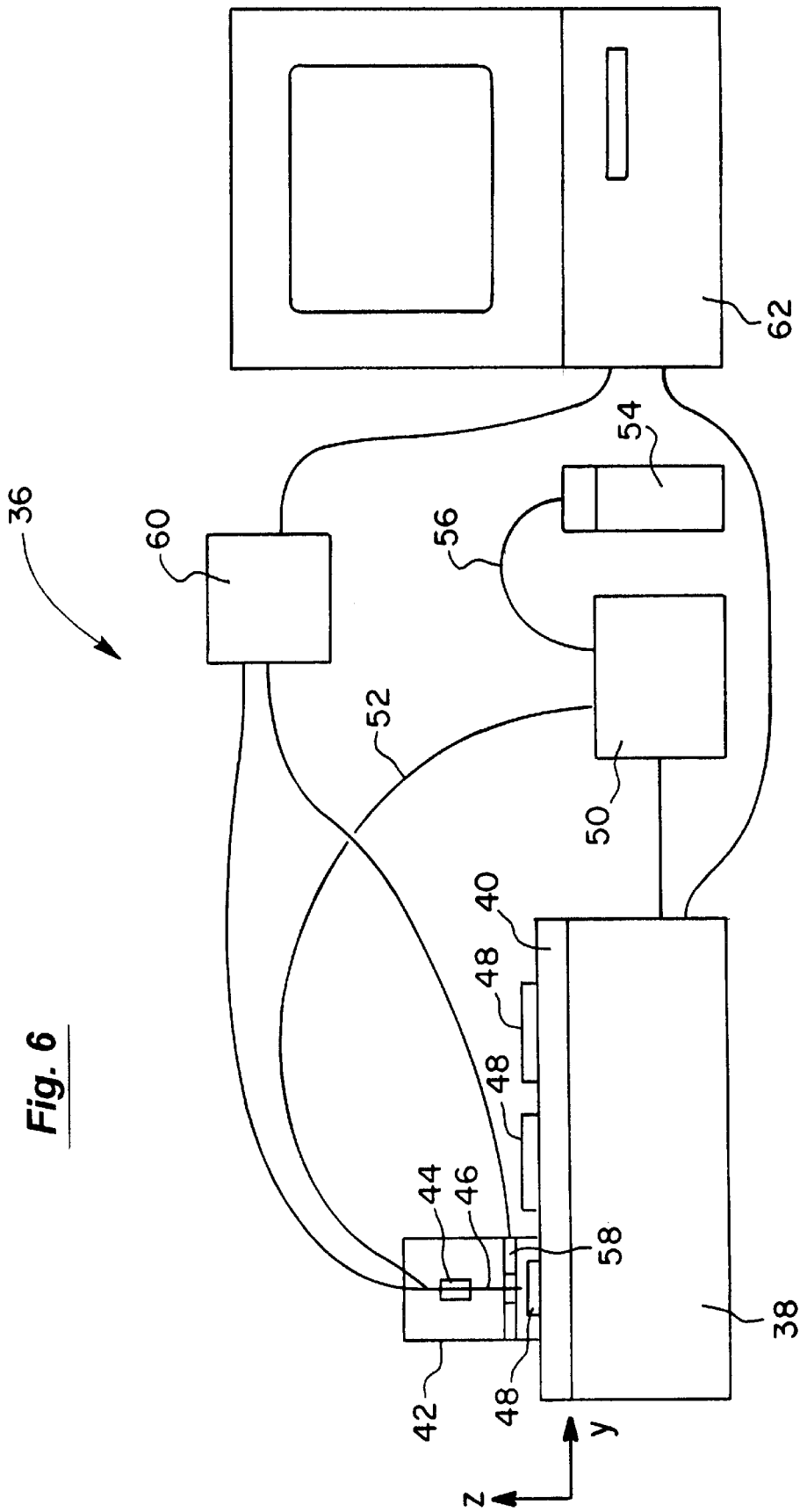
FIG. 6 is a schematic diagram of an exemplary system for processing solid supports according to the invention.

Referring now to FIG. 6, an exemplary embodiment of a system 36 for processing solid supports will be described. System 36 comprises a platform 38 having a stage 40 and a head 42. Stage 40 is configured to move along the y-axis, while head 42 is configured to move along the x-axis (in and out of the page). Coupled to head 42 is an arm 44 to which a probe 46 is coupled. Probe 46 is configured to move along the z-axis. Disposed on stage 40 are multiple plate holders 48 which each include one or more wells. With this configuration, three degrees of movement are provided so that probe 46 may be precisely positioned within any of the wells in plate holders 48. Although stage 40 is shown to move in the y-axis, head 42 is shown to move in the x-axis and probe 46 is shown to move in the z-axis, it will be appreciated that different configurations may be provided to allow for three degrees of motion. Hence, the invention is not intended to be limited to the specific configuration of platform 38. An exemplary platform having three degrees of motion as just described is a Cartesian XYZ 3200 Display Platform, commercially available from Cartesian Technologies Inc.

Platform 38 preferably includes a microprocessor to control movement of its various components. Conveniently, the microprocessor within platform 38 may also be provided to control operation of a syringe pump 50 which is electrically coupled to platform 38.

Syringe pump 50 is coupled to probe 46 by a length of tubing 52. Syringe pump 50 is also coupled to a reservoir 54 by tubing 56. In this way, pump 50 may be employed to transfer a fluid from reservoir 54 and into probe 46. Syringe pump 50 may also be employed to aspirate fluids through the lumen in probe 46 as previously described. In this way, beads may be attracted to probe 46 after it is placed into a well as previously described. Also, pump 50 may be employed to prime probe 46 so that it is filled with an electrically conductive medium to facilitate conductivity detection. An exemplary syringe pump which may be employed by the invention is a Cavro syringe pump, commercially available from Cartesian Technologies, Inc. Although a syringe pump is shown, it will be appreciated that a variety of other pumps may be employed by the invention including a Gilson 401C Dilutor, available from Gilson, Inc., Middleton, Wis.

As described in greater detail hereinafter with reference to FIG. 10, probe 46 includes a pair of electrodes (not shown) to detect whether a bead has been attached to probe 46 in a manner similar to that previously described. Coupled to arm 44 is a tray 58 which includes a pair of optical sensors (not shown) disposed on opposite sides of probe 46. In this way, the size of a bead on probe 46 may be determined in a manner similar to that previously described.

System 36 further includes an interface 60 which sits between the electrodes of probe 46 and the optical sensors disposed on tray 58 and a computer 62. Computer 62 may comprise any one of a variety of Pentium-type personal computers as is known in the art. Interface 60 measures the conductivity of the electrodes on probe 46 and transmit this information to computer 62. Interface 60 also provides an interface between the optical detector on tray 58 and computer 62. An exemplary optical sensor that may be employed is a Keyence optical system, commercially available from Keyence Corporation, Osaka, Japan. Computer 62 includes a microprocessor that is able to process the conductivity measurements and the data provided by the optical sensor so that it may send a signal to platform 38, instructing platform 38 when to move its various components and when to actuate pump 50.

For example, computer 62 may send a signal to platform 38 to cause an instruction to be sent to pump 50 to aspirate fluid into probe 46. Interface 60 is employed to measure the conductivity to determine if a bead was successfully attracted. This information is forwarded to computer 62. If a bead was successfully attracted, computer 62 sends a signal to platform 38 to cause probe 46 to be raised. At this point, the optical sensors are employed to determine the size of the attached bead. This information is transmitted from interface 60 to computer 62. Another message may then be sent from computer 62 to platform 38 to cause probe 46 to be moved into a well of another one of plate holders 48, and to cause pump 50 to dispense fluid in order to expel the attached bead.

Conveniently, computer 12 may be provided with application software to provide a convenient interface to allow various types of information to be entered into computer 12. Exemplary software that may be utilized with computer 62 is Lab View 5.0 software, commercially available from National Instruments, Austin, Tex.

Figure 7:
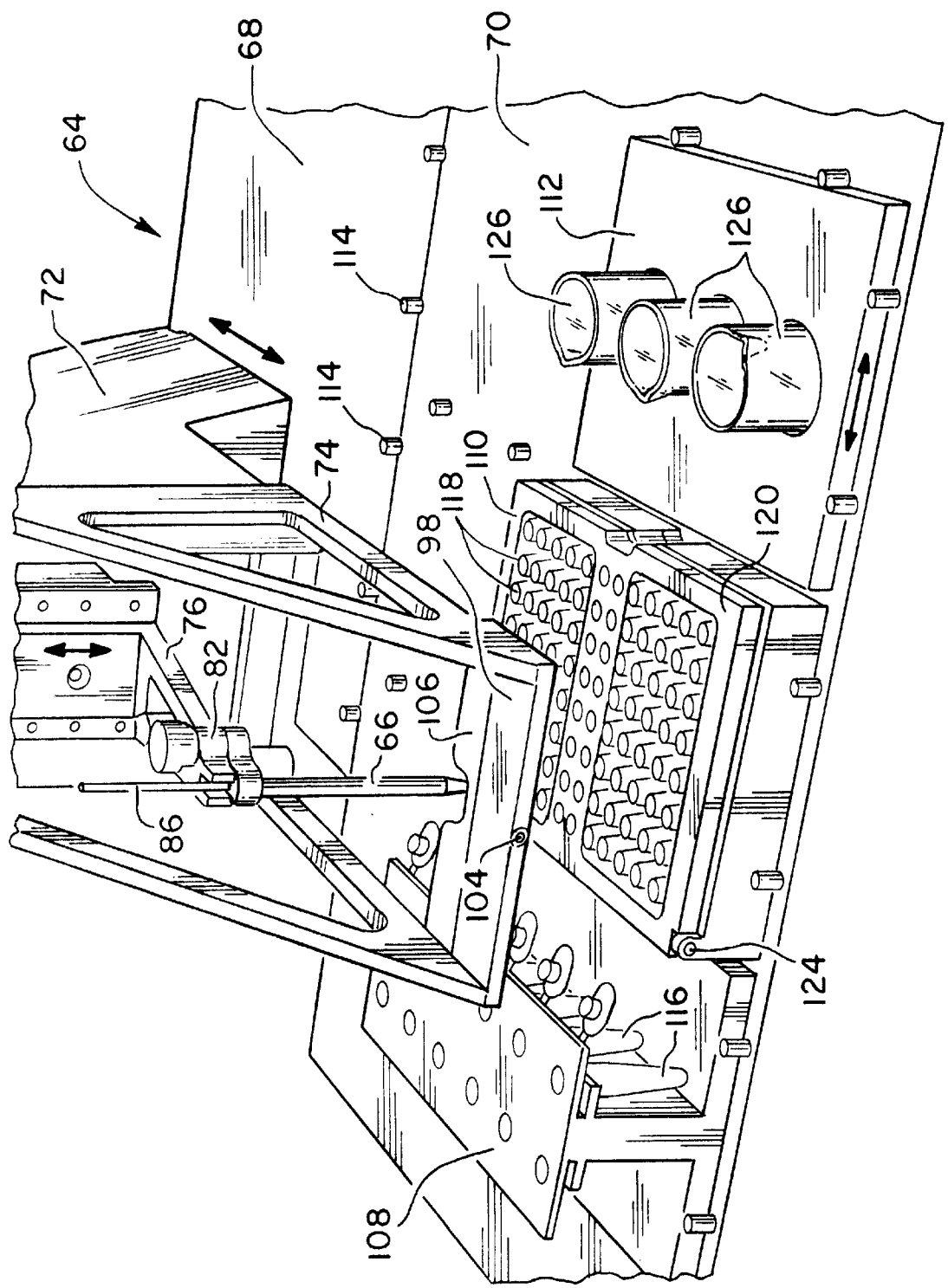
FIG. 7 is a partial perspective view of an exemplary system for processing solid supports according to the invention.
Figure 8:
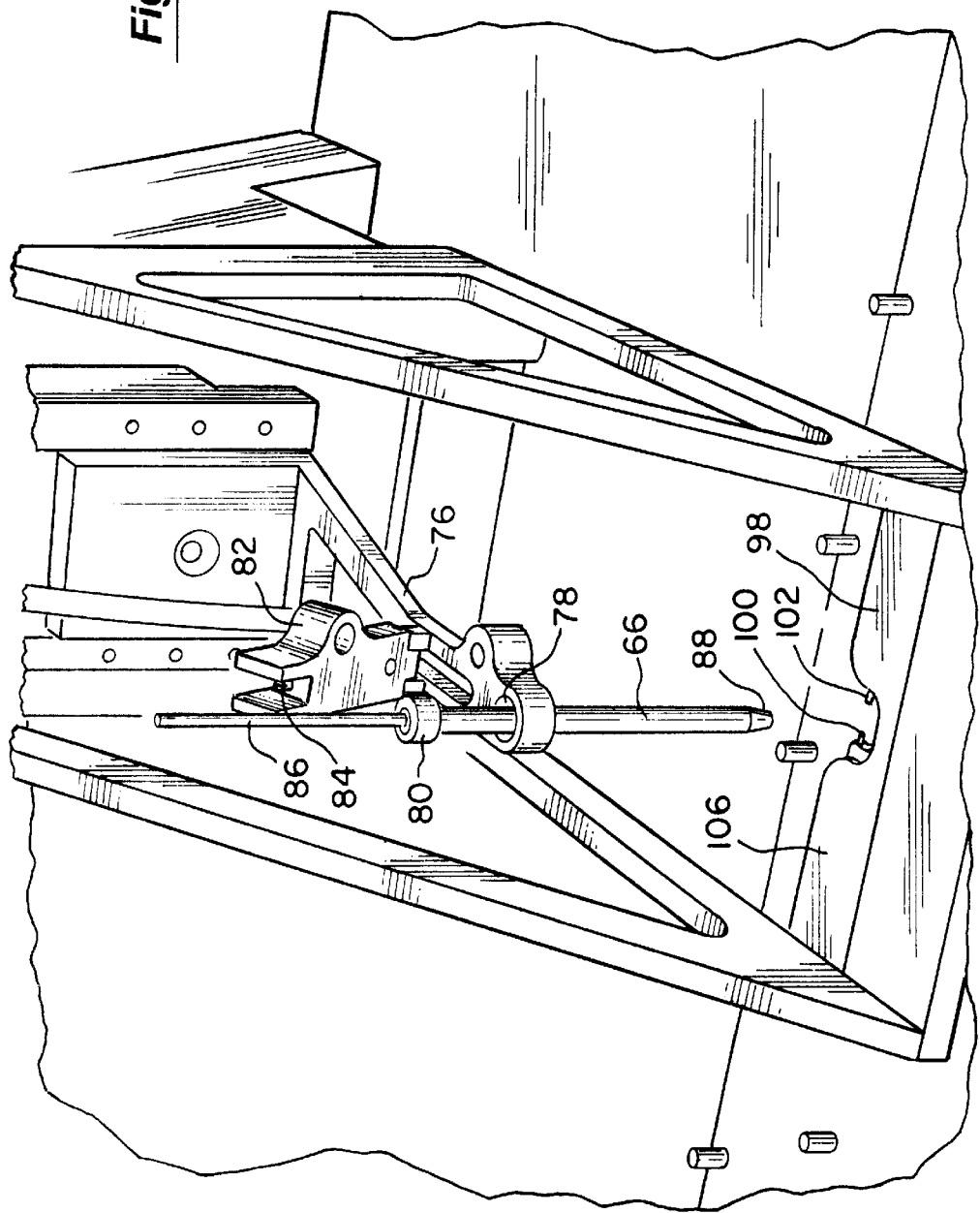
FIG. 8 is a more detailed view of a probe of the system of FIG. 7.
Figure 9:
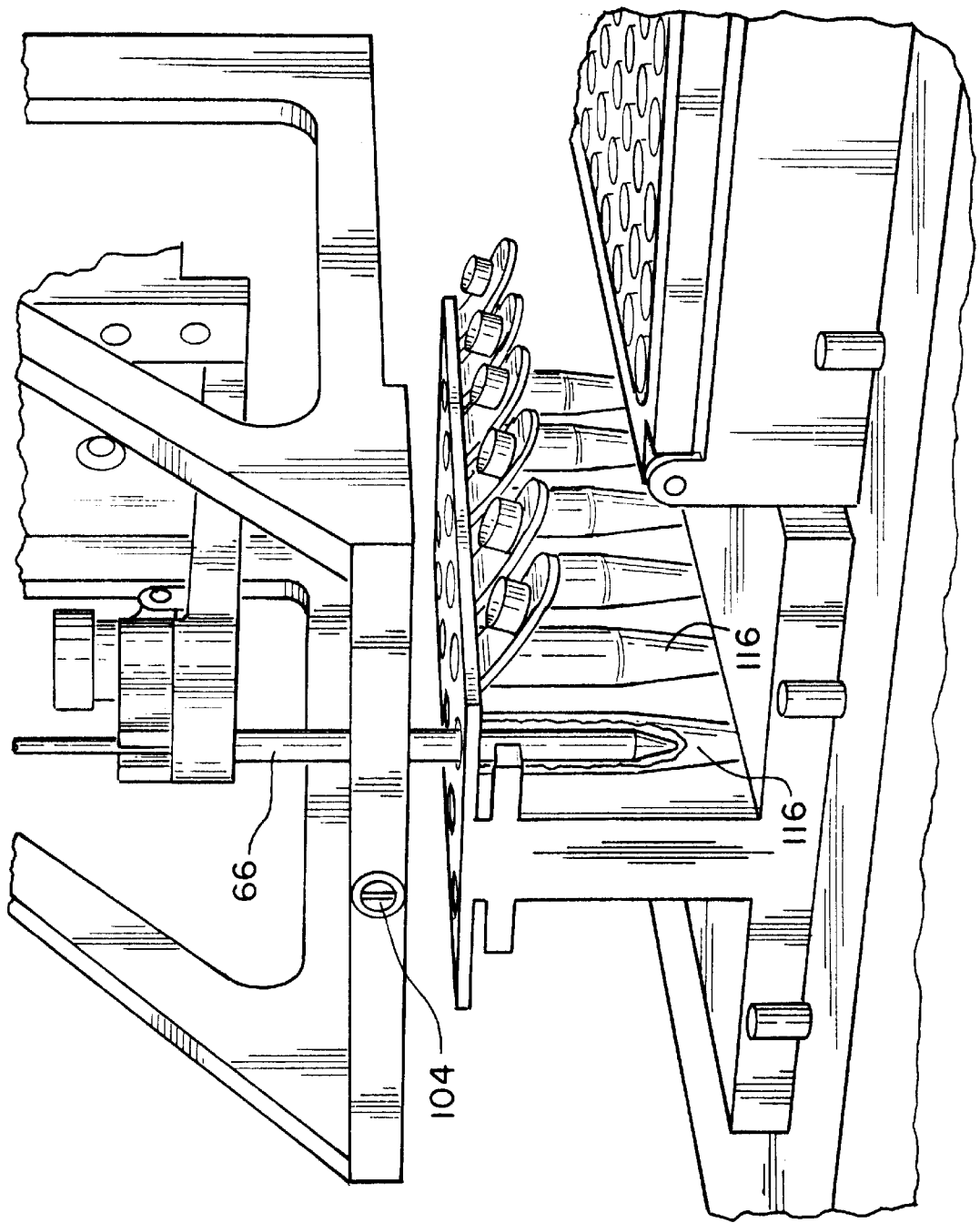
FIG. 9 illustrates the probe of the system of FIG. 7 being inserted into a well.

Referring now to FIGS. 7–9, an exemplary embodiment of a platform 64 to which a probe 66 is coupled will be described. Platform 64 operates in a manner similar to platform 38 which is schematically illustrated in FIG. 6. Platform 64 is constructed of a base 68 which houses the appropriate motors, gears, electrical circuitry, and the like employed to operate platform 64. Disposed on base 68 is a stage 70. Stage 70 is moveable along a horizontal y-axis. Also coupled to base 68 is a head 72 to which an arm 74 is coupled. Head 72 is configured to move arm 74 along a horizontal x-axis. Also coupled to head 72 is probe 66. Head 72 is configured to move probe along a vertical z-axis. Probe 66 is coupled to head 72 by an extension 76. Head 72 is configured to move extension 76 in an up and down motion relative to stage 70. During movement of extension 76, arm 74 is prevented from moving up and down so that probe 66 moves relative to arm 74. Conveniently, a stepper motor may be employed to move extension 76 vertically up and down.

As best shown in FIG. 8, extension 76 includes an aperture 78 into which probe 66 is received. As described in greater detail hereinafter, probe 66 includes a metal collar 80 which limits the depth of insertion of probe 66 into aperture 78.

Extension 76 further includes a pivotal jaw 82 which is provided with a metal screw 84. As jaw 82 is pivoted to rest on extension 76, screw 84 comes into contact with a metal tube 86 of probe 66. In this way, an electrical connection is provided for one of the electrodes on probe 66.

Figure 10:
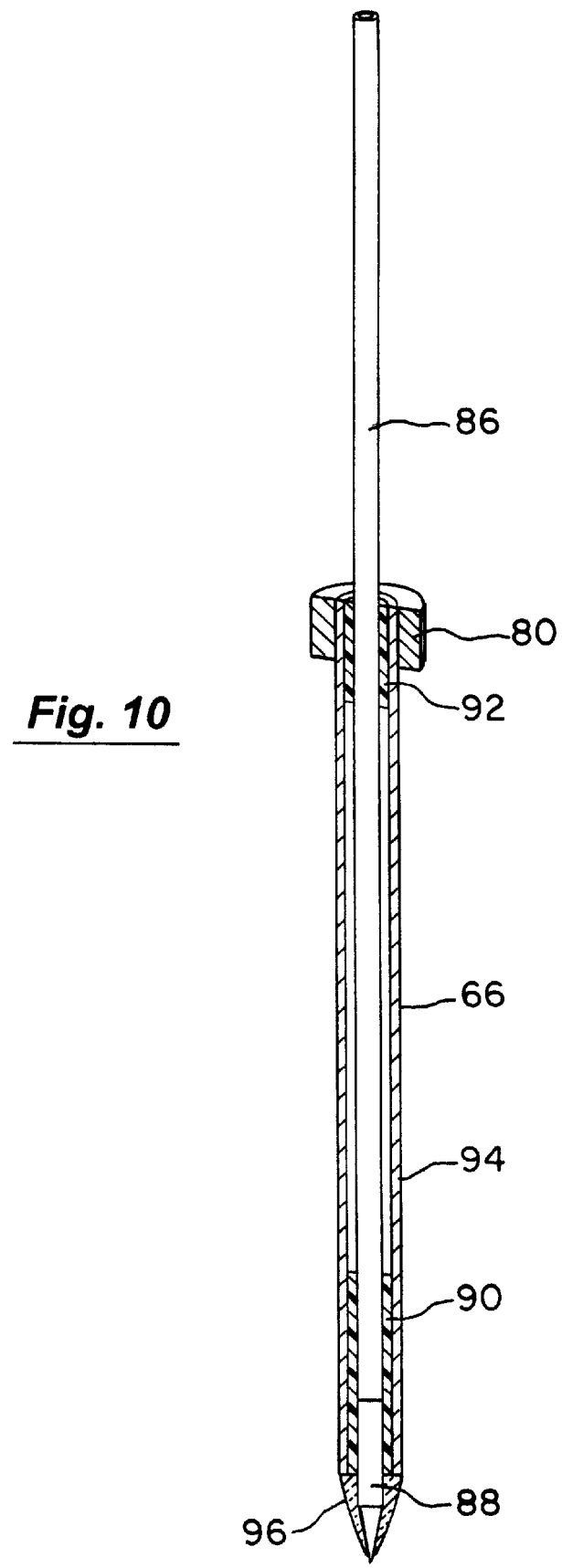
FIG. 10 is a cross sectional view of an exemplary probe according to the invention.

Referring also now to FIG. 10, construction of probe 66 will be described in greater detail. As previously described, probe 66 includes a metal tube 86. Although not shown, extending through metal tube 86 is a central lumen through which fluids may be passed. Coupled to metal tube 86 is a ceramic capillary tip 88. The capillary tip 88 is aligned with the lumen in tube 86 so that a fluid may be passed completely through the lumen in tube 86 and through the distal end of capillary tip 88. An exemplary capillary tip which may be employed is a 56 micron orifice capillary tip, commercially available from Micro Swiss.

Metal tube 86 preferably comprises a $\frac{1}{16}$ inch length of stainless steel tubing. Press fit about tubing 86 and capillary tip 88 is a plastic sleeve 90 which is preferably constructed of PEAK. Spaced apart from sleeve 90 is another sleeve 92 and acts as an insulating spacer. Disposed about tubing 86 and sleeves 90 and 92 is another length of stainless steel tubing 94 which is preferably constructed of ¼ inch stainless steel tubing. Tubing 94 is arranged such that the end of sleeve 92 is flush with the end of tubing 94. Also, metal collar 80 is flush with tubing 94. Tip 88 is preferably coated with a heat curable silver filled epoxy 96. Use of epoxy 96 is advantageous in that it provides an electrically conductive extension to tubing 94 and is compatible with most solvents. Epoxy 96 thus allows probe 66 to be placed in relatively shallow solvents while still providing an electrically conductive path. In addition to providing insulation, sleeve 90 also provides a fluid seal to prevent liquids from entering into probe 66 outside the central lumen.

In use, fluids may either be dispensed from or aspirated into the central lumen in order to attract or expel a bead from capillary tip 88. Further, the construction of probe 66 is such that it includes two electrodes. One electrode is formed by metal tubing 86, while the other electrode is formed by metal tubing 66 in combination with epoxy 96. In this way, when the central lumen is filled with an electrically conductive medium, current may be passed through the capillary at capillary tip 88. For example, current may pass through tubing 86, through the conductive medium, out capillary tip 88 and back through tubing 94. Of course, current may also pass in an opposite direction. In this manner, if a bead is attached to capillary tip 88, a change in current in the circuit may be detected to indicate that the bead has been attached. Referring back to FIG. 8, electrical current may be provided to tubing 86 by screw 84 as previously described. The return current may be passed through tubing 94 and through extension 76 to provide the electrical circuit.

As best shown in FIG. 8, arm 74 includes a tray 98 which includes a pair of optical sensors 100 and 102. Optical sensors 100 and 102 are arranged such that capillary tip will break a beam of light that passes between the sensors when probe 66 is moved passed the sensors. In this way, the size of an attached bead may be detected as previously described. Aperture 78 is preferably keyed so that probe 66 is inserted at the same position each time. In this way, the system does not need to be recalibrated each time the probe is removed and reinserted.

As best shown in FIGS. 7 and 9, tray 98 includes an adjustment screw 104 and a spring loaded section 106. Section 106 is moved forward and backward by turning screw 104. In this way, the horizontal orientation of optical sensors 100 and 102 may be adjusted to ensure that the light path will intersect capillary tip 88.

Referring now to FIG. 7, stage 70 includes various types of plate holders. As shown, stage 70 includes a source plate holder 108, a designation plate holder 110 and a wash plate holder 112. However, it will be appreciated that a wide variety of plate types and arrangements may be provided on stage 70, and the invention is not intended to be limited by the specific arrangement shown in FIG. 7. Conveniently, stage 70 includes a plurality of pegs 114 which are employed to locate and position the various plate holders.

Source plate holder 108 is shown holding a plurality of epandorf tubes 116 which preferably hold a liquid having a plurality of beads which are to be transferred into wells 118 of destination plate holder 110. Conveniently, tubes 116 include tapered bottom ends to facilitate exhaustive picking of the beads from tubes 116 utilizing probe 66.

Destination plate holder 110 is configured to hold 96 wells which are arranged in a conventional 96 well format as is known in the art. Plate holder 110 includes a top member 120 which is designed to maintain wells 118 in a generally flat orientation. Conveniently, top member 120 includes a middle strip 122 which prevents the middle wells from bowing upwardly. By maintaining wells 18 generally level, a way is provided to ensure that probe 66 will be inserted to the proper depth for each well. To remove wells 18 from plate 110, top member 120 is pivoted about pins 124 so that the wells may be removed.

Wash plate holder 112 holds three beakers 126 which are employed to hold a wash solution. In this way, beads which are removed from tubes 116 may be dipped into beakers 126 to wash the beads.

Referring now to FIG. 9, placement of probe 66 into one of tubes 116 will be described. Initially, platform 64 is in a home position. After receiving instructions to move probe 66 to the farthest tube 116, stage 70 is moved along with head 72 to position probe 66 over tube 116. Extension 76 is then moved vertically downward by head 72 until probe 66 is placed within tube 116. Cycles of aspirating and dispensing may then be employed to attract a bead to probe 66 in a manner similar to that previously described. Once a bead has been attracted, extension 76 is raised to lift probe 66 from tube 116. Probe 66 is raised such that the bead is between optical sensors 100 and 102 (FIG. 8) so that the size of the bead may be measured. Typically, probe 66 will then be moved over one of beakers 126 and then inserted into the wash solution within beaker 126. After being removed from beaker 126, sensors 100 and 102 are again employed to ensure that the bead remains attached to probe 66. Probe 66 may then be moved over one of wells 118 and subsequently lowered into the well. An amount of fluid is then dispensed from probe 66 to expel the bead into the well. Probe 66 is then raised and sensors 100 and 102 are employed to ensure that the bead was actually dispensed.

As previously mentioned, platform 64 in connection with probe 66 may be employed to process various solid supports under a variety of different circumstances. Merely by way of example, two useful applications are described in FIGS. 11 and 12. However, it will be appreciated that other layouts and processes may be performed using platform 64.

Figure 11:
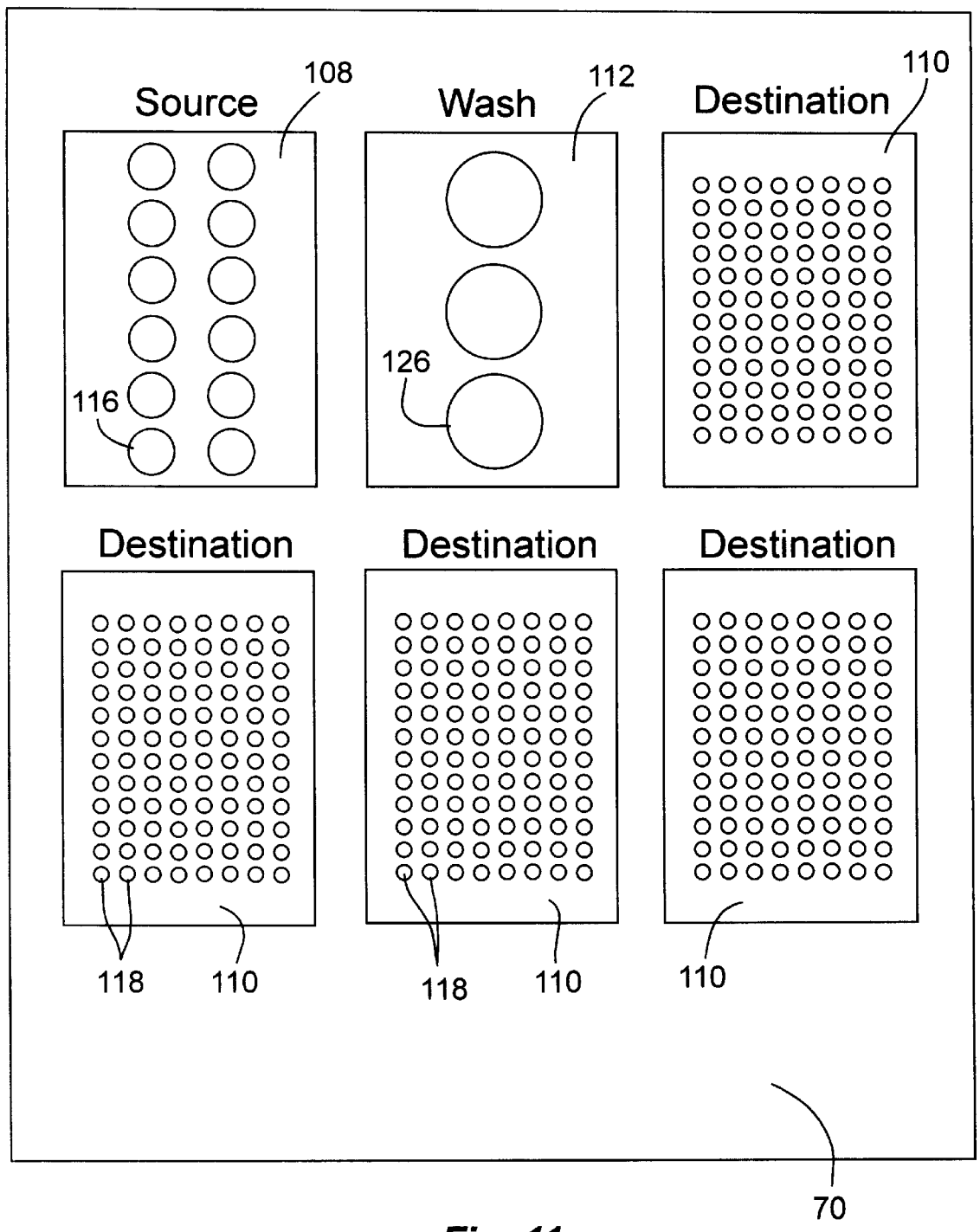
FIG. 11 is a schematic illustration of one type of plate arrangement for the system of FIG. 7.

In FIG. 11, stage 70 includes one source plate holder 108, one wash plate holder 112 and multiple destination plate holders 110. The layout of FIG. 11 is preferably utilized to screen the quality of the library prior to performing assays on the beads. With this configuration, each tube 116 preferably includes about 100 to about 1,000 beads. Probe 66 is moved into one of tubes 116 and a volume is aspirated to attach a bead. The probe detects to see if a bead was successfully attached, and if not, the process is repeated. Once a bead is attached, it is removed from tube 116, optically measured, and then moved to wash beaker 126 where it is washed. In some cases, washing 126 will also serve to remove extraneous beads (which may have already been detected by the optical measurement). The bead is then dispensed into one of wells 118 in one of the destination plate holders 110.

Figure 12:
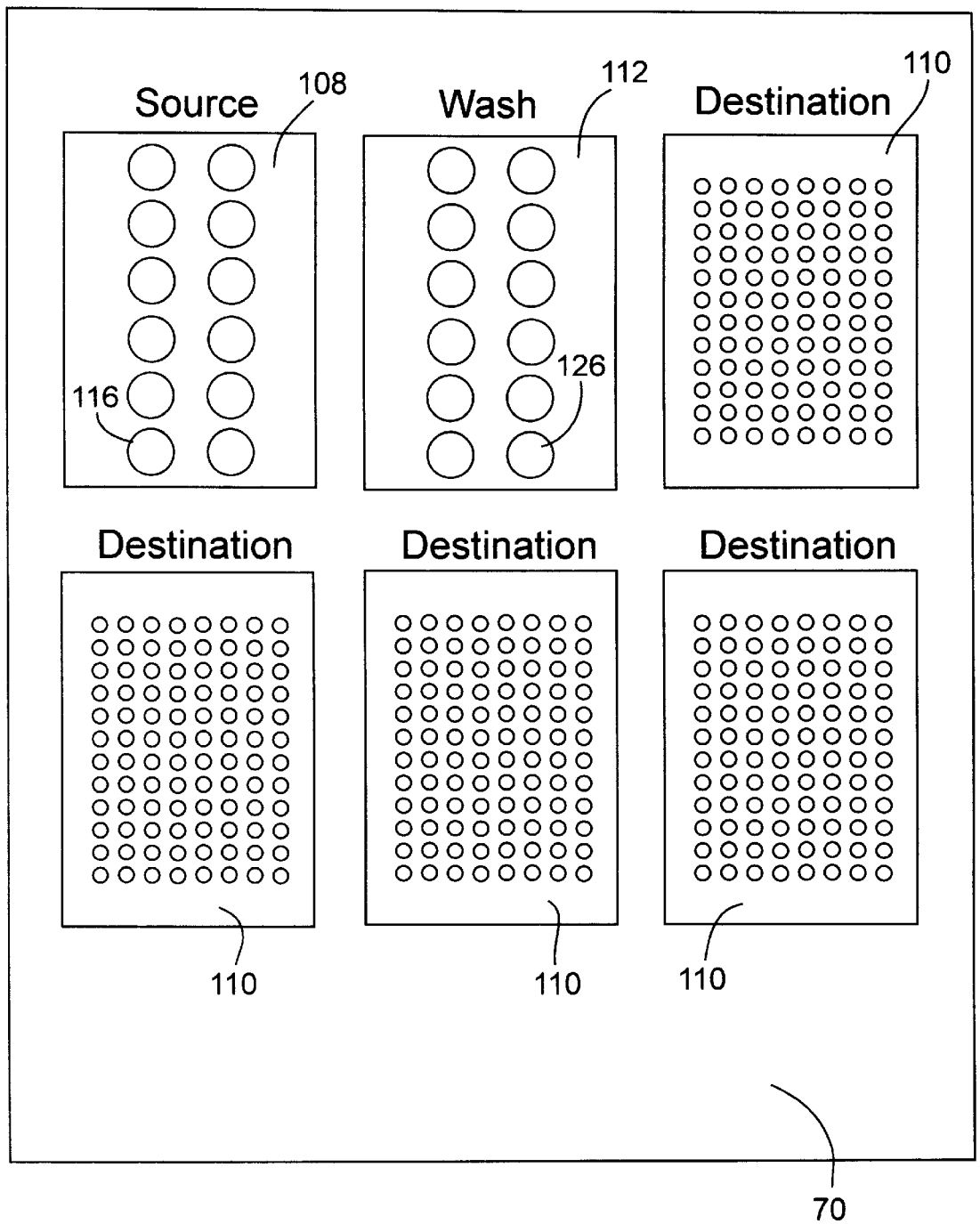
FIG. 12 is a schematic illustration of an alternative plate arrangement according to the invention.

The layout in FIG. 12 is essentially identical to the layout in FIG. 11 except that wash plate holder 112 includes one beaker 126 for every tube 116 in source 108. The layout of FIG. 12 is particularly useful for post-assay procedures where hits from pools are decoded. After the probe has removed a bead from one of tubes 116, it is washed in a corresponding beaker 126 in wash plate holder 112 before being placed in a destination well 118.

The invention has now been described in detail for purposes of clarity of understanding. However, it will be appreciated that certain changes and modifications may be practiced within the scope of the appended claims.

What is claimed is:

1. A system for processing solid supports, comprising:
    a probe having a distal end and a lumen terminating at the distal end;
    a transport mechanism which is adapted to place the distal end of the probe into a well having a plurality of solid supports held within a fluid;
    a detection mechanism which is adapted to detect the presence or absence of one of the solid supports at the distal end while the distal end is within the fluid; and
    a measuring system which is adapted to measure the general size of the solid support at the distal end.

2. A system as in claim 1, wherein the detection mechanism comprises a pair of electrodes disposed to pass electrical current through the distal end of the probe and circuitry to measure a change in current passing between the electrodes.

3. A system as in claim 1, wherein the measuring system comprises a pair of spaced-apart optical fibers disposed to produce a beam of light which is at least partially blocked by the solid support at the distal end of the probe after the distal end is removed from the well by the transport mechanism.

4. A system as in claim 1, further comprising a pump to aspirate a volume of fluid from the well and into the lumen to attract the solid support to the distal end of the probe.

5. A system as in claim 4, wherein the pump comprises a syringe pump.

6. A system as in claim 4, wherein the pump is disposed to dispense fluid from the lumen to expel an attached solid support.

7. A system as in claim 1, wherein the transport mechanism is configured to move the probe along a vertical z-axis.

8. A system as in claim 7, wherein the transport mechanism further comprises a head which is configured to move the probe along a horizontal x-axis, and a stage which is adapted to hold the well and to move along a horizontal y-axis.

9. A system as in claim 8, further comprising a holding mechanism which is adapted to hold a plurality of wells, and wherein the holding mechanism is attachable to the stage.

10. A system as in claim 1, further comprising at least one processor which is configured to control operation of the transport mechanism, the detection mechanism and the measuring system.

11. A method for processing solid supports, comprising:
providing a plurality of solid supports which are disposed within a well containing a fluid;
inserting a probe having a distal end and a lumen terminating at the distal end into the well such that the distal end is within the fluid;
aspirating a volume of fluid from the well and into the lumen;
detecting the presence or absence of one of the solid supports at the distal end while the distal end is within the fluid, and if the absence of the solid support is detected, repeating the aspirating step until the presence of one of the solid supports is detected or until the aspirating step has been repeated a predetermined number of times; and
removing the probe from the well.

12. A method as in claim 11, further comprising dispensing fluid from the lumen and into the well before repeating the aspirating step.

13. A method as in claim 12, further comprising dispensing and aspirating fluid in substantially equal volumes.

14. A method as in claim 11, further comprising measuring the size of the solid support that is attached to the distal end.

15. A method as in claim 14, wherein the measuring step comprises placing the solid support in a light beam and measuring a change in the passage of light caused by the solid support.

16. A method as in claim 11, wherein the fluid is electrically conductive, and wherein the detecting step comprises passing electrical current through the distal end of the probe and measuring to detect a change in the amount of current after the aspiration step.

17. A method as in claim 11, wherein the solid supports comprise generally spherical beads having a size in the range from about 1 $\mu$m to about 1000 $\mu$m.

18. A method as in claim 11, further comprising placing the distal end of the probe having the solid support into another well having a washing solution, removing the distal end from the washing solution and sensing whether the solid support is still attached to the distal end.

19. A method as in claim 11, further comprising placing the distal end of the probe having the solid support into a destination well, dispensing fluid from the lumen to expel the solid support into the destination well, removing the distal end from the destination well and sensing whether the solid support has been successfully expelled into the destination well.

20. A method for processing solid supports, comprising:
providing a plurality of solid supports which are disposed within a well containing a fluid;
inserting a probe having a distal end and a lumen terminating at the distal end into the well such that the distal end is within the fluid;
aspirating a volume of fluid from the well and into the lumen;
detecting whether one of the solid supports has been attached to the distal end of the probe while the distal end remains within the fluid;
removing the probe from the well if one of the solid supports has been detected; and
measuring the size of the solid support while the solid support is attached to the distal end of the probe.

21. A method as in claim 20, wherein the fluid is electrically conductive, and wherein the detecting step comprises passing electrical current through the distal end of the probe and measuring to detect a change in the amount of current after the aspiration step.

22. A method as in claim 20, wherein the measuring step comprises placing the sold support in a light beam and measuring a change in the passage of light caused by the solid support.

* * * * *